United States Patent [19]

Yee et al.

[11] Patent Number: 5,894,285

[45] Date of Patent: Apr. 13, 1999

[54] METHOD AND APPARATUS TO SENSE AIRCRAFT PILOT EJECTION FOR RESCUE RADIO ACTUATION

[75] Inventors: David Moon Yee, Scottsdale; Neal Robert Anderson, Mesa; Robert Henry Bickley, Paradise Valley; James Harvey Fleming, Phoenix, all of Ariz.

[73] Assignee: Motorola, Inc., Schaumburg, Ill.

[21] Appl. No.: 08/929,334

[22] Filed: Aug. 29, 1997

[51] Int. Cl.$^6$ .............................. G01S 5/02; H04B 7/185
[52] U.S. Cl. .................................... 342/357; 701/213
[58] Field of Search .................... 342/357, 419, 342/417; 701/213; 340/146.2

[56] References Cited

U.S. PATENT DOCUMENTS

| | | | |
|---|---|---|---|
| 4,845,464 | 7/1989 | Drori et al. | 340/429 |
| 5,274,560 | 12/1993 | LaRue | 364/444 |

Primary Examiner—Thomas Tarcza
Assistant Examiner—Dao L. Phan
Attorney, Agent, or Firm—Frank J. Bogacz

[57] ABSTRACT

A sensor apparatus to sense when an aircraft pilot has ejected is provided for safe actuation of a rescue locator radio. The ejection sensor apparatus (20) has a microphone (40), an accelerometer (35) and logic for determining that a pilot ejection event has occurred. The microphone (40) detects the differences in sound level (30) from normal cockpit noise to those during ejection and after deployment of a rescue chute. The accelerometer (35) detects the differences in acceleration level (25) during ejection and after deployment of a rescue chute. Pre-programmed acceptance templates (55) are compared in a digital processor (60) to ensure that ejection has occurred before a rescue radio (90) is activated. A manual turn on delay or turn off capability for the rescue radio is provided for facilitation of communications. Encrypted GPS location information and a pilot code are also included in the rescue radio transmission.

20 Claims, 2 Drawing Sheets

METHOD AND APPARATUS TO SENSE AIRCRAFT PILOT EJECTION FOR RESCUE RADIO ACTUATION

BACKGROUND OF THE INVENTION

The present invention relates generally to downed pilot rescue and more particularly to a method and apparatus for sensing aircraft pilot ejection for rescue radio actuation.

When a pilot has a problem that forces the pilot to ejection from an airplane, automatic actuation of a radio transmission for position locating the pilot is desirable. Location information such as obtained by GPS can also be determined without pilot involvement. The location information or position data can then be encrypted and transmitted along with an identifying code of the pilot and messaging for local search and rescue.

Present downed pilot rescue systems use a mechanical device that turns on rescue locator transmitters. Once turned on after ejection, these devices stay on until reset or switched off. The problem created by this approach is that the pilot might not be conscious or unable to turn off the device. If there is always a constant radio beacon, unfriendly forces might be able to home in on the radio beacon and find the downed pilot. Pull cords, lanyards and cable devices have always been considered unacceptable by flight safety authorities.

Accordingly, it would be advantageous to have a method and apparatus for sensing ejection with a non-contact sensor, e.g. other criteria for sensing actual injection is preferred. A way of manually turning off or on the rescue radio would also be desirable in the pilot ejection sensor for radio activation system.

BRIEF DESCRIPTION OF THE DRAWINGS

The invention is pointed out with particularity in the appended claims. However, other features of the invention will become more apparent and the invention will be best understood by referring to the following detailed description in conjunction with the accompanying drawings in which:

DETAILED DESCRIPTION OF THE PREFERRED EMBODIMENT

Figure 1:
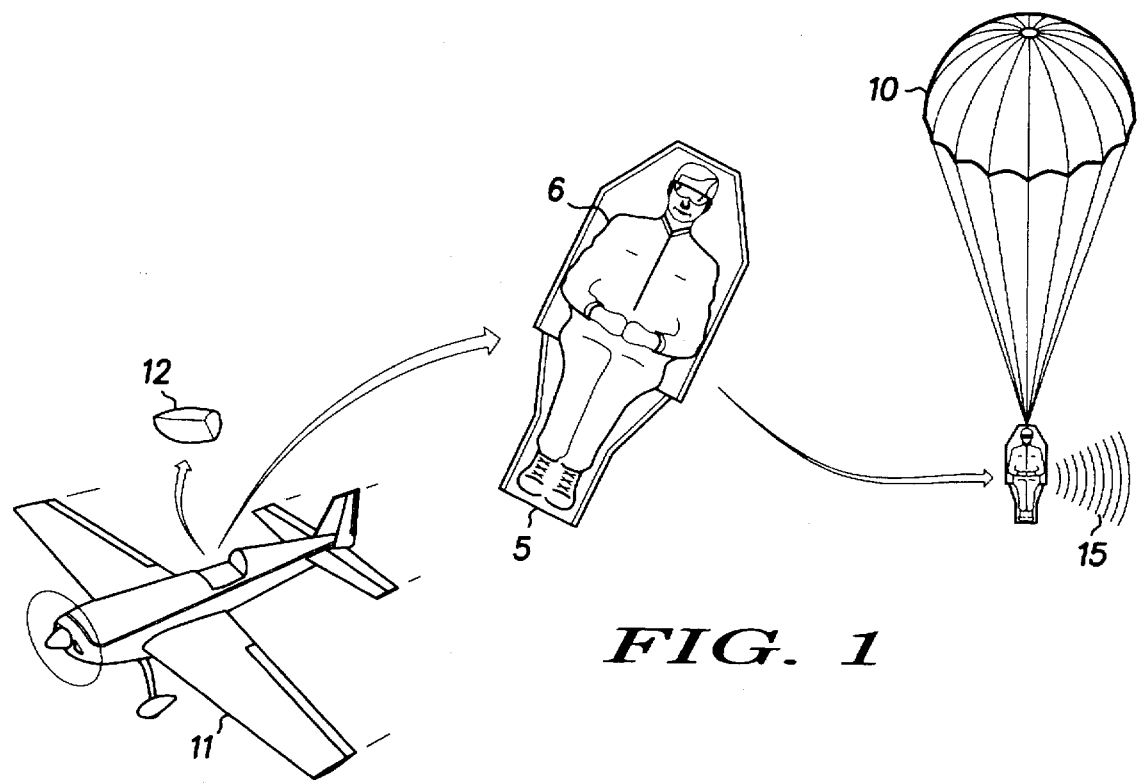
FIG. 1 depicts a typical pilot ejection event.

In accordance with the present invention, a novel method and apparatus for sensing an aircraft pilot ejection occurrence for rescue radio actuation will be presented. The sequence of events are illustrated in FIG. 1 for an aircraft 11 with an aircraft cockpit 12.

The ejection occurrence 5 for an aircraft pilot 6 is shown. The subsequent chute opening 10 and turn on of transmission 15 from the rescue radio completes the sequence for enabling the sending out of signals for aiding in the search and rescue of an aircraft pilot 6 that is downed.

Figure 2:
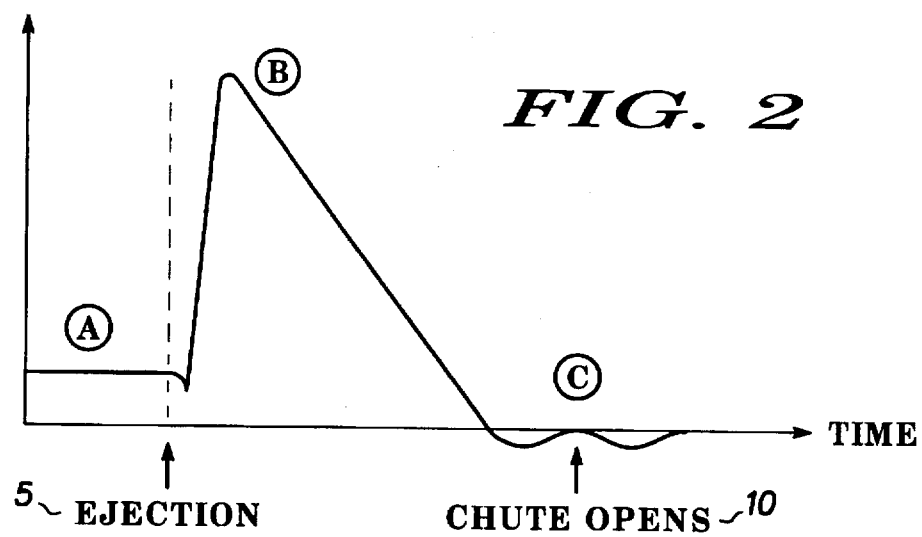
FIG. 2 is a graph of an accelerometer sensor output for acceleration level versus time during the ejection event in accordance with the present invention.

Referring to FIG. 2, the present invention measures the acceleration level 25 profile versus time. The ejection occurrence 5 of a pilot causes the acceleration level of the pilot and his ejection seat to increase to some level B. The ejection acceleration level is considerably above any normal aircraft acceleration level. The acceleration then decreases until the chute opens 10, which results in a transient and change in direction of the acceleration level.

Figure 3:
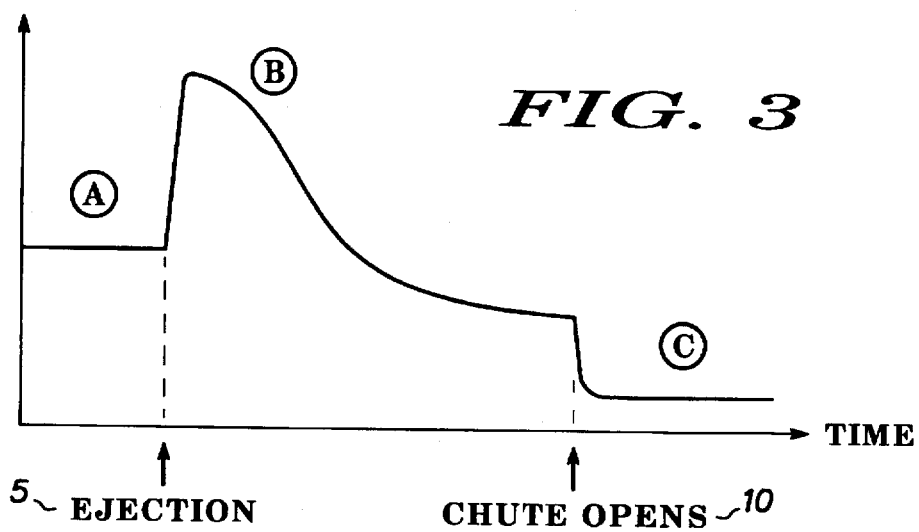
FIG. 3 is a graph of an acoustic sensor output for sound level versus time during the ejection event in accordance with the present invention.

Referring to FIG. 3, the present invention measures the sound level 30 versus time, at the ejection seat. Normal cockpit sound level is labeled A in FIG. 3. The ejection occurrence 5 of a pilot causes the sound level at the ejection seat to increase to some level labeled B in FIG. 3. The ejection sound levels are considerably above normal aircraft sound levels A. The sound level at the ejection seat then decreases until the chute opens 10. This results in a transient and a further decrease in the sound level at the ejection seat to some sound level labeled C in FIG. 3.

Figure 4:
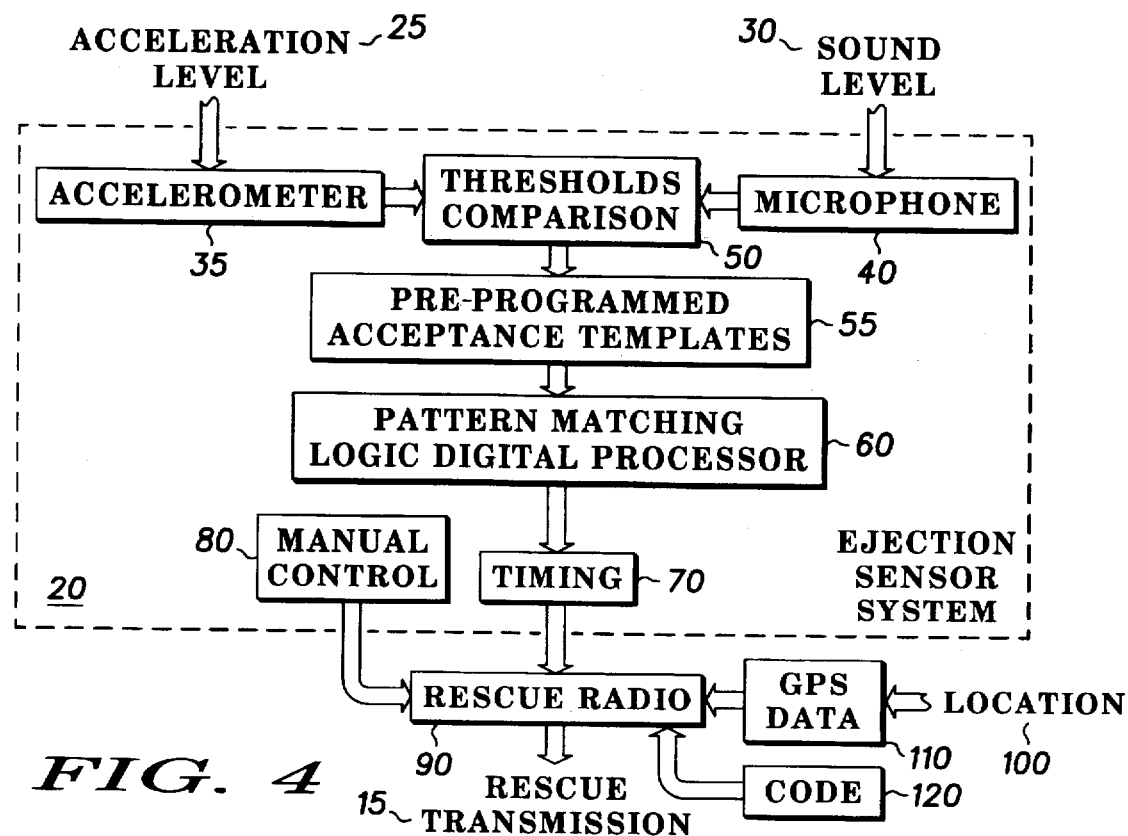
FIG. 4 is a block diagram depicting the pilot ejection sensor system architecture in accordance with the present invention.

Referring to FIG. 4, a generalized block diagram of the apparatus and method is presented. The low power ejection sensor apparatus 20 monitors the acceleration level 25 and the sound level 30 at all times that the aircraft is in operation. The acceleration level is measured by a solid state or similar accelerometer 35 and the sound level is measured by a microphone 40.

The threshold comparison 50 provides an initial indication of an ejection occurrence 5 of a pilot. The accelerometer and microphone outputs are connected to the threshold comparison 50. The measured levels are compared with pre-programmed acceptance templates 55 using a digital processor 60 having pattern matching logic.

The digital processor 60 determines that the level changes shown in FIG. 2 and FIG. 3 have occurred and have been properly detected. Included are the changes in the acceleration and sound levels for the cockpit level A before ejection, level B after ejection and level C after the chute opens and the pilot slows down. Timing 70 of the acceleration and sound data occurrences further provides high confidence that a pilot ejection has occurred and not a mission anomaly.

The threshold comparison 50 can be performed in a large scale integrated, LSI, processor or other suitable processor. A digital processor 60 with pattern matching logic scans the acceleration and sound level sensor outputs on a regular basis. When the acceleration and sound level patterns fit the pre-programmed template, a signal is generated by the processor to start the rescue radio transmission 15.

A manual control 80 of the associated rescue radio 90 operation is provided to start a rescue radio transmission 15. The manual control 80 makes it possible for the downed pilot to communicate to search and rescue teams with the rescue radio 90 and to send out the location 100 information.

The manual control 80 overrides the low power ejection sensor apparatus 20 in case there has been any problem with the accelerometer 35 sensor, the microphone 40 sensor, the threshold comparison 50, the digital processor 60 with pattern matching logic or the timing 70 sequence sensing and logic.

The rescue radio 90 receives location 100 information as GPS data 110 for encryption to send with an identification code 120 or a message to alert a search and rescue team. Transmission 15 will aid in finding a downed pilot after ejection from an aircraft. The ejection sensor apparatus disclosed ensures that the rescue radio is not turned on by itself in any situation other than the ejection sequence.

Manual control facilitates the rescue operation by friendly forces and reduces the probability of the downed pilot from being found by others.

The use of environmental sensors to detect an event and initiate a radio transmission could be also applied to detect automobiles or civil aircraft crashes, weapons discharges, artillery firings, or explosions in buildings or industrial areas, etc. The outputs of the sensors would be compared to pre-programmed levels to minimize false alarms. When the sensor outputs meet the pre-programmed profile, a signal could be generated to activate an alarm or send out location information.

While specific embodiments of the present invention have been shown and described, it will be apparent to those skilled in the art that the disclosed invention can be modified in numerous ways and can assume many embodiments other than the preferred form specifically set out and described above. Accordingly, it is intended by the appended claims to cover all modifications of the invention that fall within the true spirit and scope of the invention.

What is claimed is:

1. An sensor apparatus for detecting ejection of an aircraft pilot to actuate a rescue radio, said sensor apparatus comprising:
   a microphone to sense a current sound level;
   a pre-programmed acceptance template including ejection sound levels stored in a digital processor;
   an accelerometer to sense a current acceleration level;
   a pre-programmed acceptance template including ejection acceleration levels stored in said digital processor;
   a digital processor coupled to said microphone and to said accelerometer for scanning said microphone and said accelerometer;
   said digital processor comparing said current sound level with said ejection sound levels of said pre-programmed acceptance template to indicate a first comparison;
   said digital processor for comparing said current acceleration level with said ejection acceleration levels of said pre-programmed acceptance template to indicate a second comparison; and
   an actuator for activating a rescue radio in response to said first and second comparisons, said actuator coupled to said rescue radio and to said digital processor.

2. A sensor apparatus that detects ejection of an aircraft pilot to actuate a rescue radio, as claimed in claim 1, the sensor apparatus further comprising a control for enabling the aircraft pilot to control the rescue radio manually.

3. A sensor apparatus that senses ejection of an aircraft pilot to actuate a rescue radio, as claimed in claim 2, wherein the sensor apparatus further comprises a control for enabling the aircraft pilot to control the rescue radio manually to ensure that the rescue radio does not turn on without said first and second comparisons.

4. A sensor apparatus that senses ejection of an aircraft pilot to actuate a rescue radio, as claimed in claim 1, wherein there is further included a global positioning system or GPS monitor for providing position information to said rescue radio.

5. A sensor apparatus that senses ejection of an aircraft pilot to actuate a rescue radio, as claimed in claim 1, wherein there is further included a pilot code generator module for providing a pilot identifying code to said rescue radio.

6. A sensor apparatus that senses ejection of an aircraft pilot to actuate a rescue radio, as claimed in claim 1, wherein the sensor apparatus further uses a digital processor to provide pulse timing for activation of the rescue radio.

7. A sensor apparatus that senses ejection of an aircraft pilot to actuate a rescue radio, as claimed in claim 1, wherein the sensor apparatus further uses a digital processor that is a large scale integrated LSI circuit with all circuitry to detect pre-programmed template levels and provide said first and second comparisons.

8. A sensor apparatus that senses ejection of an aircraft pilot to actuate a rescue radio, as claimed in claim 7, wherein the digital processor includes all circuitry for:
   detection of pre-programmed template levels first and second comparisons;
   send a signal to turn on the rescue radio;
   activate determination of messaging or GPS position information;
   activate transmission of the messaging or GPS position information over an appropriate rescue band; and
   power down the rescue radio.

9. A sensor apparatus that senses ejection of an aircraft pilot to actuate a rescue radio, as claimed in claim 7, wherein the digital processor further includes all the circuitry to ensures that acoustic and acceleration sensor levels are differentiated from other aircraft operations.

10. A sensor apparatus that senses ejection of an aircraft pilot to actuate a rescue radio, as claimed in claim 7, wherein the digital processor includes all the circuitry to further ensures that acoustic and acceleration signatures levels discriminate from field operations.

11. A sensor apparatus for detecting ejection of an aircraft pilot, said sensor apparatus comprising:
   a microphone to sense a current sound level;
   a pre-programmed acceptance template including ejection sound levels stored in a digital processor;
   an accelerometer to sense a current acceleration level;
   a pre-programmed acceptance template including ejection acceleration levels stored in said digital processor;
   a digital processor coupled to said microphone and to said accelerometer for scanning said microphone and said accelerometer;
   said digital processor comparing said current sound level with said ejection sound levels of said pre-programmed acceptance template to indicate a first comparison;
   said digital processor for comparing said current acceleration level with said ejection acceleration levels of said pre-programmed acceptance template to indicate a second comparison; and
   an output signal provided in response to said first and second comparisons.

12. A method for actuating a rescue radio upon ejection of an aircraft pilot, said method comprising the steps:
   providing a pre-programmed acceptance template of ejection sound levels;
   providing a pre-programmed acceptance template of ejection acceleration levels;
   sensing a current sound level with a microphone;
   sensing a current acceleration level with an accelerometer;
   coupling a digital processor to said microphone and said accelerometer for scanning said microphone and said accelerometer;
   comparing by said digital processor said current sound level with said ejection sound levels of said pre-programmed acceptance template to indicate a first comparison;
   comparing by said digital processor said current acceleration level with said ejection acceleration levels of said pre-programmed acceptance template to indicate a second comparison; and
   activating with an actuator a rescue radio in response to said first and second comparisons, said actuator coupled to said rescue radio and to said digital processor.

13. A method for sensing ejection of an aircraft pilot for actuating a rescue radio, as claimed in claim 12, wherein sensing ejection of an aircraft pilot for actuating a rescue radio step further includes a step of turning on or off the rescue radio manually.

14. A method for sensing ejection of an aircraft pilot for actuating a rescue radio, as claimed in claim 13, wherein there is further included a step of using a digital processor to provide pulse timing for activation of the rescue radio.

15. A method for sensing ejection of an aircraft pilot for actuating a rescue radio, as claimed in claim 14, wherein there is further included a step of using a digital processor that is a large scale integrated LSI circuit with all needed circuitry for detecting pre-programmed template levels.

16. A method for sensing ejection of an aircraft pilot for actuating a rescue radio, as claimed in claim 15, wherein there is further included steps of:

detecting of pre-programmed template levels;
   sending a signal to turn on the rescue radio;
   accepting messages or position information;
   transmitting the messages or position information over an appropriate rescue band;
   delaying turn-on, if desired; and
   powering down the rescue radio as needed.

17. A method for sensing ejection of an aircraft pilot for actuating a rescue radio, as claimed in claim 16, wherein there is further included a step of ensuring that consistent acoustic and acceleration signatures differentiate sensor levels from other aircraft operations.

18. A method for sensing ejection of an aircraft pilot for actuating a rescue radio, as claimed in claim 13, wherein there is further included a step of ensuring that acoustic and acceleration signatures set aside sensor levels from other situations a pilot might encounter in field operations.

19. A method for sensing ejection of an aircraft pilot for actuating a rescue radio, as claimed in claim 18, wherein there is further included a step of utilizing threshold levels comprising:

monitoring acceleration levels in a cockpit;
   monitoring acceleration levels of an ejected pilot;
   monitoring acoustic levels in a cockpit; and
   monitoring acoustic levels of an ejected pilot.

20. A method for sensing ejection of an aircraft pilot for actuating a rescue radio, as claimed in claim 19, wherein there is further included a step of inserting into a transmission a code for pilot identification.

* * * * *